UNITED STATES PATENT OFFICE.

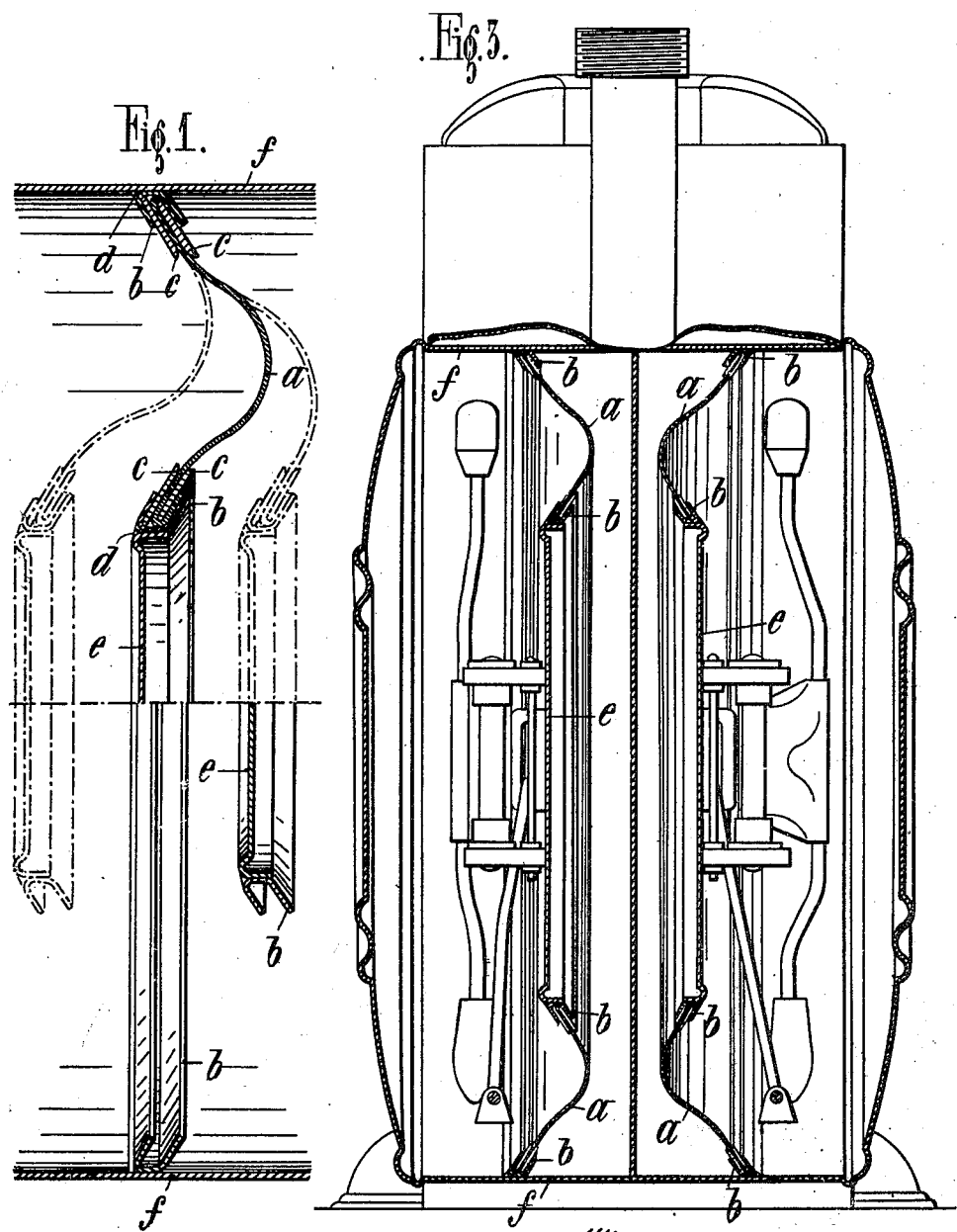

GEORGE HEELEY, OF PARIS, FRANCE, ASSIGNOR TO LA COMPAGNIE POUR LA FABRICATION DES COMPTEURS ET MATÉRIEL D'USINES À GAZ, OF PARIS, FRANCE.

BELLOWS FOR DRY GAS-METERS.

1,036,233.

Specification of Letters Patent. Patented Aug. 20, 1912.

Application filed May 6, 1911. Serial No. 625,584.

*To all whom it may concern:*

Be it known that I, GEORGE HEELEY, a citizen of the French Republic, and residing at 27 Rue Claude Vellefaux, Paris, France, have invented a certain new and useful Bellows for Dry Gas-Meters, of which the following is a specification.

This invention relates to the bellows of dry gas meters, and has for the object to provide improved arrangements of the membrane and its method of attachment to the internal walls of the meter, whereby the working of this type of apparatus is improved as regards constant correctness in measuring, the absorption of pressure and permanent gas-tightness of the membrane.

In the greater number of dry meters now in use the membrane forming the essential part of the bellows is folded around in such a manner as to form a cylindrical sleeve the ends of which are connected to two rigid parallel disks, one fixed and the other movable so that the membrane forms a sort of cushion, the flexibility of which enables the movable disk to alternately move away from and approach the fixed disk. Each of these pulsations causes a determined volume of gas to pass from the inlet to the outlet of the meter owing to the operations of the bellows and a suitable distribution arrangement; the motion of the bellows being transmitted through gear wheels and other members to a mechanism for registering the volume consumed. These arrangements of the bellows are subject to various drawbacks. The sleeve formed by the membrane can only be obtained with one or more seams according to the dimensions of the meter: these seams destroy the homogeneity of the membrane and may be the cause of tears or perforations, which enable a certain quantity of the gas to leak through the membrane and pass from the inlet to the outlet of the meter without being measured. In the second place, during the motion of the movable disk the cushion formed by the membrane must necessarily become deformed and folded. Now the deformation varies according as the motion of the meter is more or less rapid and according to the pliability of the membrane, which does not remain always constant, the pliability of this latter varying in time and sometimes even with considerable rapidity under the action of the gas or of deposits which it may leave behind. As the deformations and folds are not always produced in the same manner the volume of gas corresponding to each pulsation evidently undergoes variations or in other words the measurement of the meter does not remain always constant. In other types of dry meters the bellows is formed by a plane or practically plane membrane fixed in place or connected without being stretched so that it can execute a pulsation on all sides of its external fixed attachment rings each pulsation causing the membrane to inclose a volume bounded by two truncated conical surfaces. When the membrane is arranged in this way its deformations are of less importance than when it has the form of a cushion, but to pass from an extreme position to the central position the membrane must necessarily fold on itself offering a resistance to the pressure of the gas. This movement of contraction obviously absorbs a certain force and consequently a certain pressure. On the other hand when the membrane has passed its central position it tends to suddenly return to its original position and to restore the force absorbed by the contraction. It acts therefore like a spring which after having been compressed to a certain amount while offering a resistance to the movement of the bellows, subsequently expands, exerting a thrust in the direction of this said movement. These successive contractions and expansions of the membrane produce unequal fatigue at its different parts and have also the effect of causing variation in the pressure absorbed by the movement and consequently the pressure at the outlet from the meter. Lastly, there is a type of dry meter in which the membrane is adapted to assume and retain in all its positions under the pressure of the gas, the form of an annular cup concentric to the central rigid part of the bellows; in order however that the bottom of this cup may be able to follow the bellows in its movements the membrane has to undergo pronounced folds and deformations injurious to its life and to the constancy of the volume which it can inclose.

The bellows forming the object of the present invention is completely free from the above mentioned drawbacks owing to the method of attachment and operation of its membrane. The improved bellows is consequently a distinct advance in dry meters.

In the accompanying drawings which are given by way of example, Figure 1 is a vertical section of the bellows according to the invention, one part of the figure showing the fixing rings of the membrane, Fig. 2 is a view of the joint to a larger scale, Fig. 3 is a vertical section of a meter containing two bellows constructed and fixed in position according to the present invention.

The bellows comprises a flexible membrane $a$ the edges of which are of suitable shape but preferably circular and are fixed in metallic rings there being interposed between the said rings $b$ and the membrane $a$, joint pieces $c$ formed of a malleable alloy or other elastic material, which joint pieces have for their object to obviate any passage of gas to the points of fixation of the membrane $a$, without this latter being crumbled or cut during its movements by the fixing rings $b$. This arrangement has among others the advantage of obviating any folding or cutting and enabling each bellows to be fixed in the meter by means of a simple soldered joint $d$ without the heat developed during this operation being able to reach and injure the part of the membrane $a$ in contact with the gas, this part being remote from the place of soldering. To the internal attachment ring $b$ there is fixed by a soldered joint $d$ which cannot injure the membrane $a$, a metal disk $e$ which constitutes the central part of the bellows, on which disk is attached a guiding arrangement and also the rods or other members which drive the distribution and the registering mechanism.

It is to be pointed out (and this detail constitutes one of the most essential features of the new bellows) that the flanges of the rings $b$ which hold in place the membrane $a$ are not directed normally to the wall $f$ of the meter and to the edge of the movable disk $e$ to which they are soldered. They are inclined on these walls $e$ and $f$ and the membrane itself is formed in a matrix which causes its inside and outside edges to diverge and assume the inclination of the attachment rings $b$ and at its free part a curvature having a development sufficient to enable the membrane to execute its pulsations without ever being stretched between its two rings $b$. The inclination of the attachment rings $b$ and the particular curvature of the membrane $a$ have for their object to avoid that the pressure of the gas which is alternately directed toward both faces of the said membrane, should oblige this latter to bend in front of and behind its attachment rings. It will be seen that the inclination of the rings $b$ compels the membrane to remain always bent in the same direction as shown in Fig. 1, whatever the direction of the thrust of the gas. The consequence is that it does not undergo contraction, extension, nor pronounced deformation during its movements which are effected regularly without variations in the efficiency of stroke and in the pressure of issue. Moreover the arrangement above described reduces to a minimum the fatigue to which the membrane $a$ is subjected during its pulsations, since it accompanies one might say the movements of the bellows, being bent always in the same direction without its curvature sensibly changing at the places near the attachment rings which latter in consequence are not subjected to the shearing actions which are produced when the membrane is arranged in such a manner that it is alternately bent in both directions by the thrust of the gas. As for the other parts, those constituting the bottom of the basin formed by the membrane, since their flexibility results from their distance from the attachment rings and their special curvature, enable this latter to adapt itself to each position of the bellows in the small degree necessary, without the membrane being at any instant capable of offering an appreciable resistance to the thrust of the gas or to act in the opposite direction to this thrust. The extreme sensitiveness and the almost complete absence of deformations and folds insure the constancy of the volume inclosed at each pulsation and consequently the constant exactitude of the apparatus whatever the degree of flexibility of the membrane.

The bellows which has just been described has therefore all the advantages of the sleeve type of bellows from the point of view of sensitiveness of the membrane without its drawbacks resulting from folds and deformations. It also possesses all the advantages of the bellows with a plane membrane from the point of view of the absence of seams and the correctness of measuring without being like this latter subjected to stresses injurious to the life of the membrane and to the constancy of the pressure.

The membrane $a$ owing to its great sensitiveness does not offer any appreciable resistance to the thrust of the gas so that the pressure absorbed in moving the bellows is almost nil. As on the other hand there is nothing to fear from folds, deformations, shearing and other stresses, which occur in an ordinary bellows and which make it necessary to give them such dimensions that they move with extreme sluggishness so as not to curtail the life of the membrane and to keep within the fixed limits allowable for the absorption of pressure, the improved bellows may be given very small dimensions and stroke and consequently operate at a much greater speed than ordinary bellows without risk of injuring the membrane or causing an excessive absorption of pressure.

The dimensions of meters provided with the improved bellows will therefore be much smaller than those of ordinary meters.

Owing to the small dimensions of the bellows the reduced amplitude of its movements and the sensitiveness which it possesses owing to the fixation arrangement of the annular membrane this latter is of a very small development compared with those of ordinary meters. This feature is very important, because the membrane constituting the most delicate and most vulnerable part of the meter, it is evidently of consequence to be able to diminish its size and increase as much as possible that of the rigid central part of the bellows which is not subject to deterioration.

The above described arrangements may obviously be adopted whatever the number of membranes of the meter.

Having now described my invention, what I claim as new and desire to secure by Letters Patent is:—

1. In bellows for dry gas meters, the combination with a cupped annular membrane and a rigid fixed circular part to which the membrane is to be fixed by one of its edges, of an annular channel part fixed with its base externally against said fixed circular part, and having its side limbs extending from its base at an angle other than a right angle in the direction of the adjacent edge of the membrane, and means for securing said adjacent edge of the membrane in the open end of said channel part, as set forth.

2. In bellows for dry gas meters, the combination with a cupped annular membrane and a rigid fixed circular part to which the membrane is to be fixed by one of its edges, of an annular channel part fixed with its base externally against said fixed circular part, and having its side limbs extending from its base at an angle other than a right angle in the direction of the adjacent edge of the membrane, a flat annular retaining plate fitting against the inner face of one side limb of said channel part, a second flat annular retaining plate projecting inside said channel part and around which the edge of the adjacent portion of the membrane is folded between the two retaining plates and also between said second retaining plate and the other limb of said channel part, and means for fixing said channel part to said fixed circular part, as set forth.

3. In bellows for dry gas meters, the combination with a circular fixed outer part, and an inner circular part, concentric thereto, of a cupped annular diaphragm located between said fixed outer and inner parts, having its outer and inner edges directed at angles other than right angles to said fixed outer and inner parts respectively, an outer annular channel part fixed with its base to said outer circular fixed part and with its side limbs extending approximately parallel to each other in the direction of the inclined adjacent edge of said diaphragm, adapted to receive in its open end said inclined adjacent edge, and means for securing said inclined adjacent edge in said channel part, and a similarly formed, but reversely arranged inner channel part fixed to said inner circular part, with means for receiving and holding the inner edge of said diaphragm therein, as set forth.

In testimony whereof I affix my signature in presence of two witnesses.

GEORGE HEELEY.

Witnesses:
H. C. COXE,
GEORGES BONNEUIL.